April 12, 1932.        B. H. TINGLEY        1,853,751
REGISTER
Filed Jan. 10, 1927     5 Sheets-Sheet 1
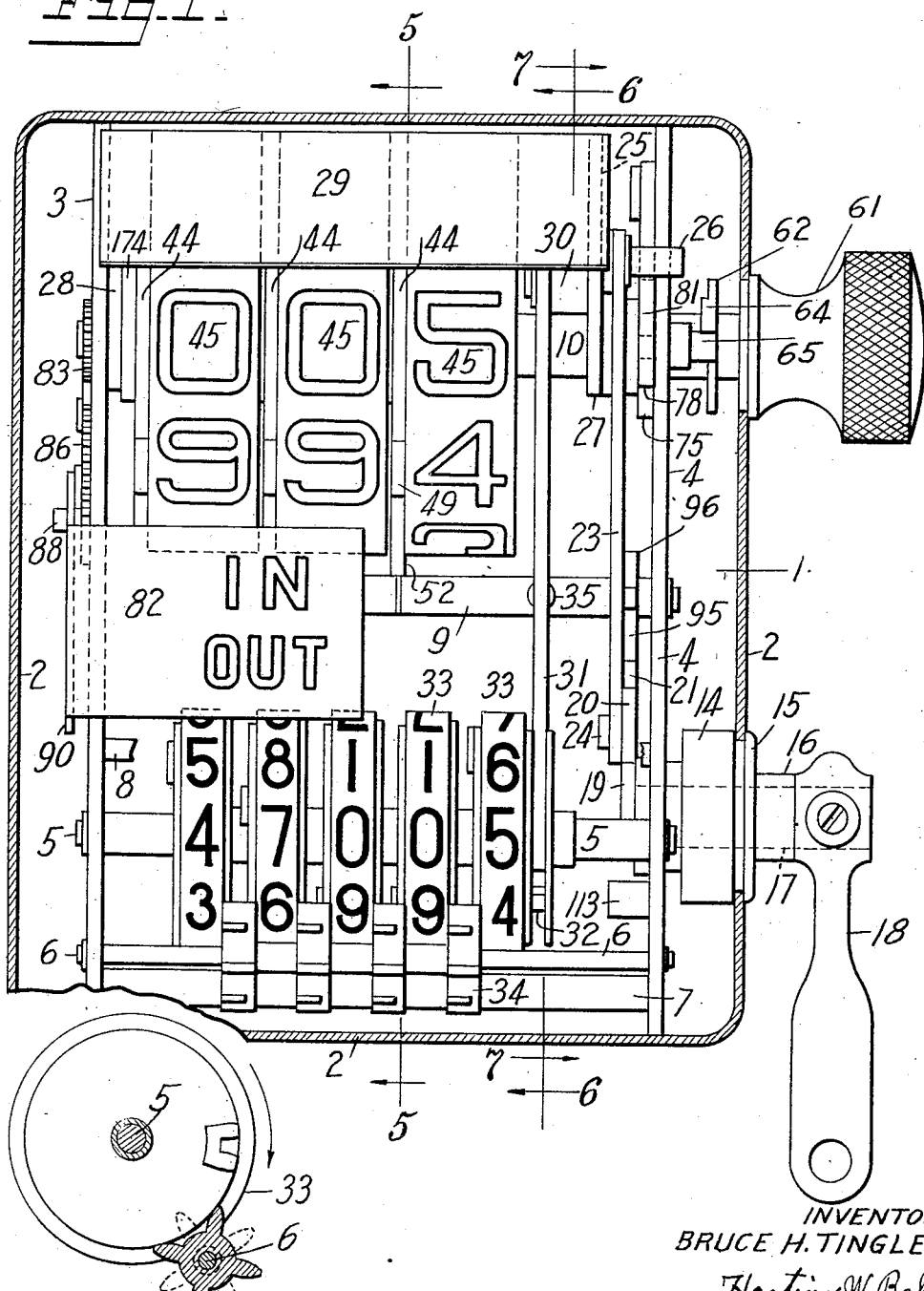
INVENTOR.
BRUCE H. TINGLEY.

April 12, 1932.   B. H. TINGLEY   1,853,751
REGISTER
Filed Jan. 10, 1927   5 Sheets-Sheet 2
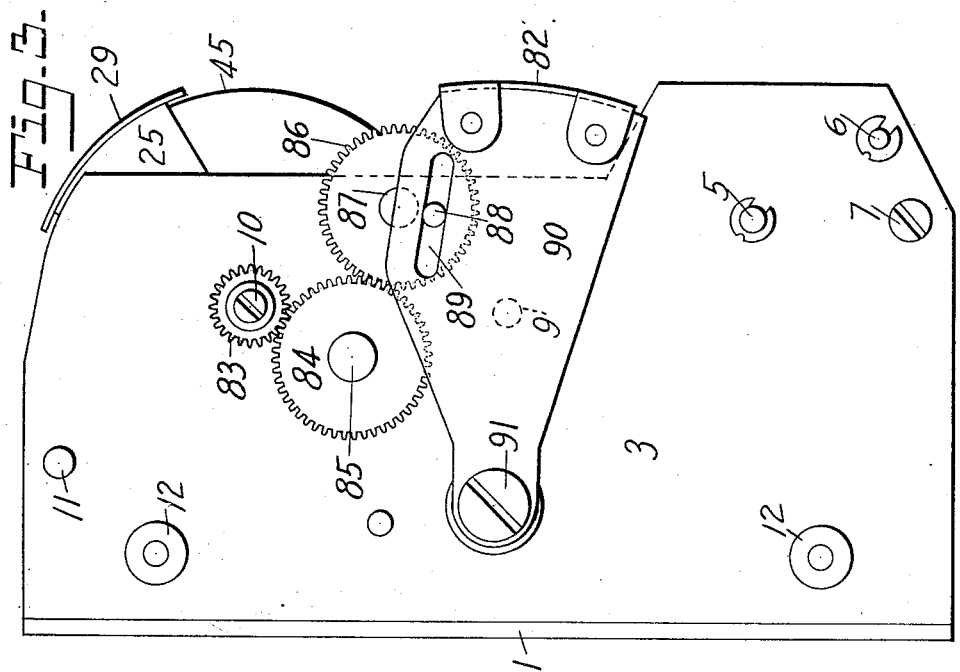
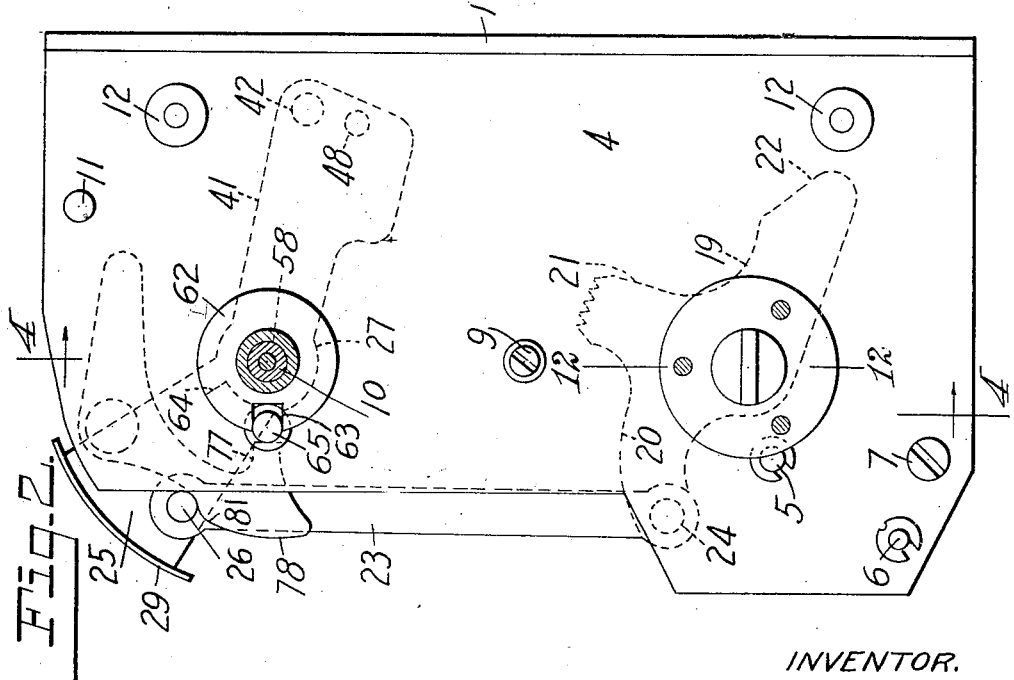
INVENTOR.
BRUCE H. TINGLEY.
Hastings W. Baker
ATTORNEY.

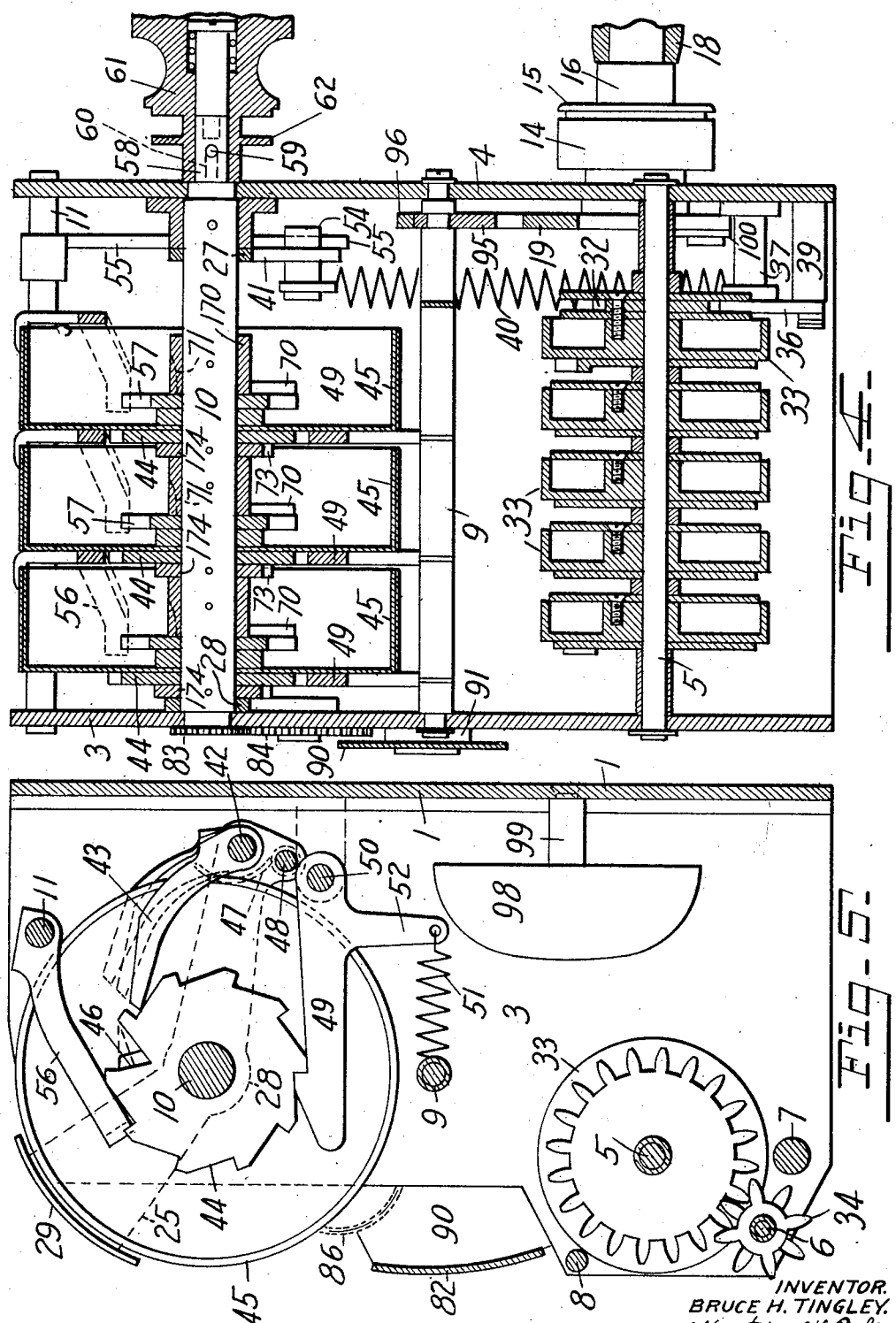

April 12, 1932.    B. H. TINGLEY    1,853,751
REGISTER
Filed Jan. 10, 1927    5 Sheets-Sheet 4
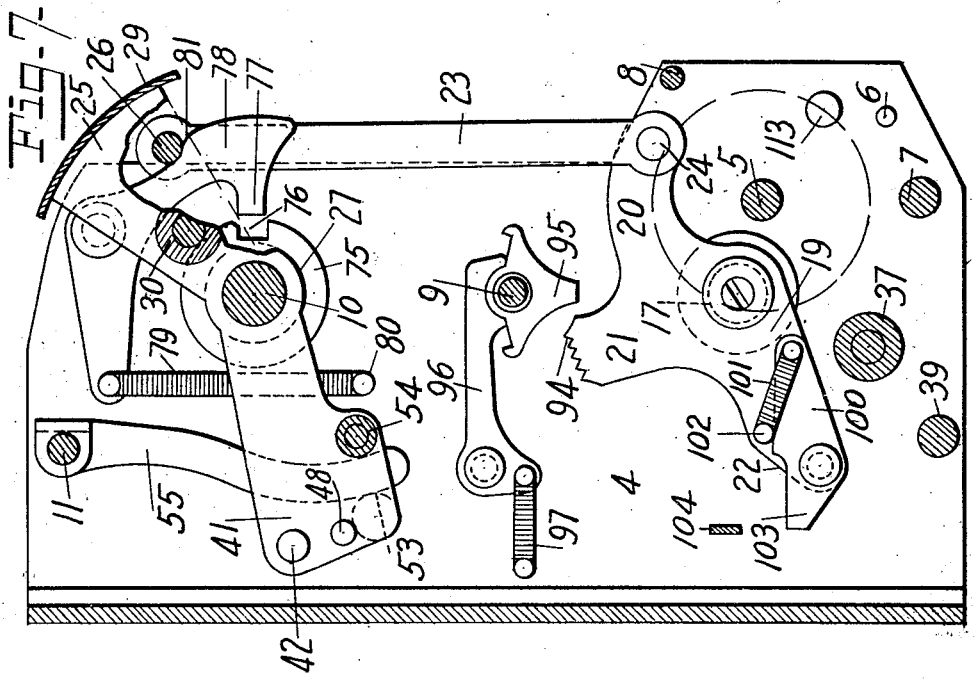
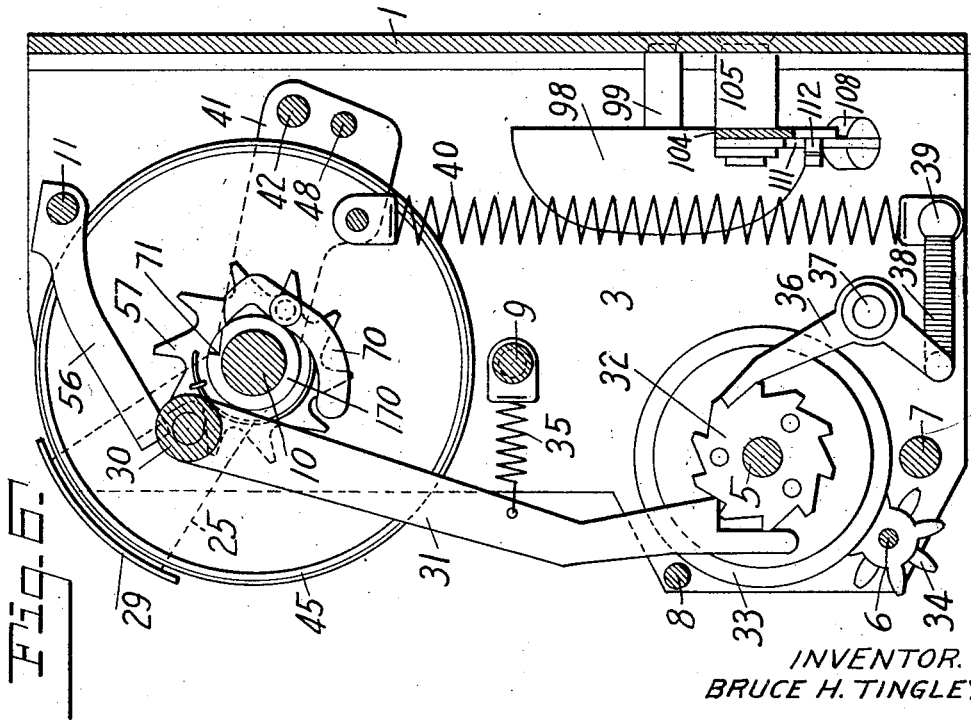
INVENTOR.
BRUCE H. TINGLEY.
Hastings W. Baker
ATTORNEY.

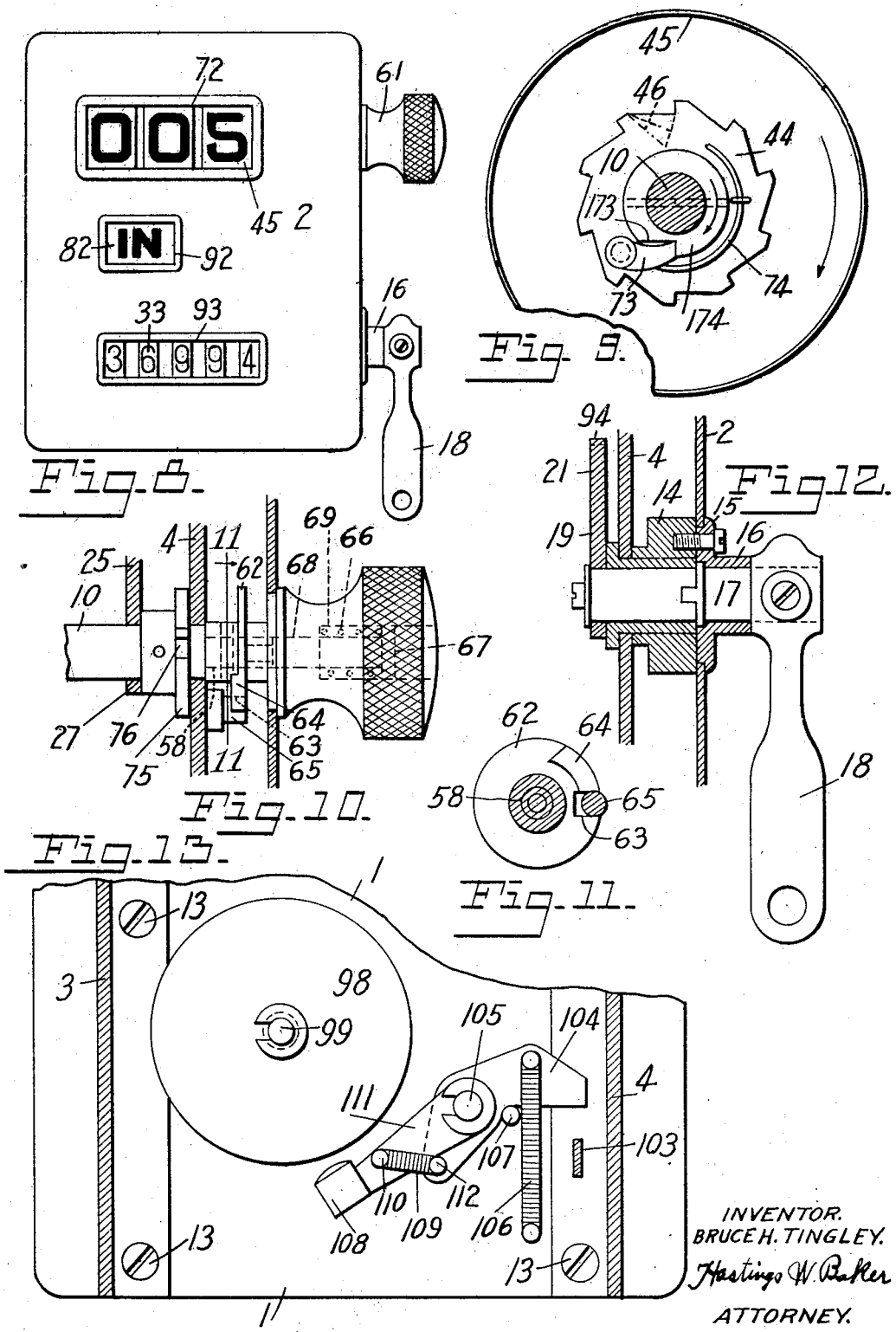

Patented Apr. 12, 1932

1,853,751

UNITED STATES PATENT OFFICE

BRUCE H. TINGLEY, OF DAYTON, OHIO, ASSIGNOR TO OHMER FARE REGISTER COMPANY, OF DAYTON, OHIO, A CORPORATION OF NEW YORK

REGISTER

Application filed January 10, 1927. Serial No. 160,012.

The object of this invention is to provide a register whereby the number of passengers carried on a street car for one trip may be registered together with the total number of passengers carried on all trips. The use, however, is not confined to street cars but may be applied to counting anything, such as sacks of flour, loaves of bread, or any other tangible objects. It may be either manually operated or automatically operated. For instance, the register may be placed in the path of travel of sacks of flour on a conveyor and as each of the sacks touches the operating lever the machine will be operated.

The invention also comprises a novel resetting means for the detail counter, locking means for the resetting means, means to prevent the overthrow of the detail counter so that only one number can be registered upon each actuation of the registering device, novel means operatively connecting the overthrow preventative means and the resetting means so as to render the resetting means inoperative when the counter is being operated, a signal to indicate when the resetting means has been operated or partially operated, means to render the operating means inoperative when the resetting means has been partially operated, and a signalling device automatically operated whenever the operating means for the register is actuated.

Other objects of the invention will appear in the detailed specification which follows.

I have shown the preferred form of my invention by way of illustration in the attached drawings forming a part of the specification.

Fig. 1 is a front elevational view with the casing removed.

Fig. 2 is an elevational view of the left side of the machine.

Fig. 3 is an elevational view of the right-hand side of the machine.

Fig. 4 is a cross-sectional view on the line 4—4 of Fig. 2 looking in the direction of the arrows.

Fig. 5 is a cross-sectional view on the line 5—5 of Fig. 1.

Fig. 6 is a cross-sectional view on the line 6—6 of Fig. 1 looking in the direction of the arrows.

Fig. 7 is a cross-sectional view on the line 7—7 of Fig. 1 looking in the direction of the arrows.

Fig. 8 is a front elevational view of the register with the casing in place.

Fig. 9 is a detailed view of a part of the resetting means.

Fig. 10 is a detailed view of another part of the resetting means, and the locking means therefor.

Fig. 11 is a cross-sectional view on the line 11—11 of Fig. 10.

Fig. 12 is a cross-sectional view on the line 12—12 of Fig. 2.

Fig. 13 is a detailed elevational view of the bell-ringing mechanism, and

Fig. 14 is a detailed view of the transfer mechanism of the totalizer counters.

Referring more in detail to the drawings, the casing consists of a back 1 and a cover 2, the cover 2 extending over the front, sides, top and bottom of the machine. The left sidewall 3 and the right sidewall 4 are secured to the back 1 by any conventional means such as the screws 13 (Fig. 13). Shafts 5, 6, 7, 8, 9, 10 and 11 connect the sidewalls 3 and 4. The shaft 5 carries the totalizer counters and the shaft 10 carries the trip counters, the word "trip" meaning the count between two resettings of the shaft 10. The shaft 6 is the transfer shaft for the totalizer counters. The shafts 7 and 8 are simply ticket rods. The shaft 9 serves as an anchor for certain springs hereinafter mentioned and also supports a part of the full-stroke mechanism. The shaft 11 is provided with arms which serve as the overthrow preventative means described in detail hereinafter. The sidewalls 3 and 4 are provided with studs 12 adapted to receive screws passing through the sidewalls of the cover 2.

The sidewall 4 is provided with a bearing 14 to which is screwed a cap 15 on the outside of the casing 2. The cap 15 is provided with a bearing 16. The bearings 14 and 16 support a shaft 17 connected to an operating handle or lever 18, which shaft 17 carries on the inner end thereof a lever 19 (Figs. 2 and 7).

The lever 19 is provided with three arms 20, 21 and 22. The arm 20 is connected to a link 23 by means of a pin 24 which link 23 is operatively connected to an oscillating member 25, best shown in Figs. 2 and 7, the pin 26 serving as the connecting medium between the link 23 and the member 25. The pin 113 serves as a stop for the lever 19. The oscillating member 25 consists of side arms 27 and 28 rotatively mounted on the shaft 10, which arms are connected by a flash 29 adapted to cover the trip counters when a number is being registered. The arm 27 carries a stud 30 connected to an operating dog 31 (Fig. 6) which actuates a ratchet 32 secured to the units counter of the totalizer 33, behind the sight opening 93 in the casing. The word "totalizer" is used in the sense of a total counter which is not reset to zero and which therefore registers the total of all numbers registered. The disks of the totalizer are operatively connected by means of any well-known transfer mechanism 34 mounted on the shaft 6. The dog 31 is pulled towards the ratchet 32 by means of a spring 35 having its other end secured on the shaft 9. A holding dog 36 is pivoted on a stud shaft 37 secured to the sidewall 3, which dog 36 is urged toward the ratchet 32 by means of a spring 38 having its other end secured to the stud shaft 39 supported by the sidewall 3 of the casing. The oscillating member 25 is normally held in the position shown in Fig. 6 by means of a spring 40 secured to the stud shaft 39 and to the rearwardly extending arm 41 of the arm 27 which is a part of the oscillating member 25. The oscillating member 25 is lowered by means of the lever 18 and is retracted to its normal position by means of the spring 40 so that the arm 41 of the oscillating member 25 is moved upwardly and then downwardly each time the lever 18 is operated. The arms 41 are connected by means of a shaft 42 which carries operating dogs 43, each succeeding dog 43 being raised slightly higher than the dog which contacts with the ratchets 44 of lower denomination, which ratchets 44 are secured to the disks 45 carrying numbers from zero to nine inclusive. Each time the lever 18 is operated the units disk 45 is thereby rotated one numeral, there being ten teeth on the ratchet 44 secured to the disk 45.

Each of the ratchets 44 is provided with one deep tooth 46 which lies adjacent the inner end of the dog 43 when the numeral 9 appears on the face of the disk 45. The units dog 43 is pulled into the deep tooth 46 by means of a spring 47 secured to the said dog 43 and to a shaft 48 connecting the arms 27 and 28. The tooth 46 is of a sufficient depth so as to permit the units dog 43 to drop sufficiently to permit the tens dog 43 to engage one of the teeth of the tens ratchet 44 so that when the lever 18 is again operated both the units and the tens disks 45 will be actuated one unit, the units advancing from nine to zero and the tens disk advancing to its next higher numeral. In like manner when the units and tens disk 45 both register 9 the deep teeth 46 of the units and tens ratchets 44 will be in operative relation to the dogs 43, so that when the lever 18 is again operated the units and tens disk 45 will advance from nine to zero and the hundreds disk will be advanced one unit. The holding dogs 49 are secured to a stud shaft 50, which dogs are urged towards the ratchets 44 by means of springs 51 secured to an arm 52 of the holding dogs and to the shaft 9.

Means are also provided to prevent the overthrow of the disks 45 of the detail counter, which means are best shown in Figs. 5 and 7. The arm 41 of the oscillating member 25 carries two studs 53 and 54 which engage an arm 55 secured to the shaft 11, which shaft has secured thereto an overthrow preventative arm 56. Each time the oscillating member 25 is rocked the studs 53 and 54 rock the shaft 11 through the arm 55 and depress the overthrow preventative arm 56 into the path of movement of the next tooth of the ratchet 57 secured to the disk 45, which tooth engages the end of the overthrow preventative arm 56 and positively stops the rotation of the disk 45.

Resetting means are provided for the detail counters or disks 45. The shaft 10 is provided with a reduced portion 58 extending beyond the sidewall 4, which reduced portion carries a pin 59, which pin extends within a slot 60 of the knob 61 which may be manually operated. The knob 61 carries a flange 62, which flange is provided with a notch 63 and a lug 64. The notch 63 normally receives a pin 65 secured to the sidewall 4, thereby locking the knob 61 against rotation. The knob 61 can be rotated, however, by pulling the same outwardly against the tension of the spring 66 lying between the head 67 of the screw 68 which extends into the outer end of the shaft 10 and the shoulder 69 of the knob 61. Each of the ratchets 57 carries a dog 70 adapted to engage a slot 71 extending throughout the portion of the shaft occupied by the disks 45. When the numeral 0 appears on the face of the disk 45 through the opening 72 (Fig. 8) the end of the dog 70 lies within the said slot 71 in the collar 170 carried by the ratchet 57 which prevents the shaft 10 from being rotated by the knob 61 in any direction other than counter-clockwise when viewed in Fig. 6 or clockwise when viewed in Fig. 9. The knob 61 can be rotated clockwise when viewed in Fig. 9 after the notch 63 is disengaged from the pin 65, and as it is so rotated the slot 173 in the collar 174 carried by the ratchet 44 engages a resetting pawl 73 thereby rotating each of the ratchets 44 and disks 45 so that 0 will appear beneath the sight opening 72.

The resetting pawl 73 is urged toward the notch 173 by means of a spring 74. As the knob 61 completes its rotation the lug 64 engages the pin 65 stopping the flange 62 so that the spring 66 will cause the notch 63 to slide over the pin 65 locking the knob 61 against further movement. If it were not for the lug 64 it might be that an operator in resetting the mechanism very rapidly could unintentionally reset the mechanism twice. After starting to reset the counters it is impossible to rotate the knob 61 in any direction other than to complete the resetting movement, for as soon as such unwarranted movement is attempted the notch 71 engages the dog 70 on the ratchet 57 which is locked against reverse rotation by means of the ratchet 44 and dogs 43. As soon as the resetting mechanism has been completely operated all of the dogs 70 and 73 are in engagement with the notches 71 and 173 respectively so that it is impossible to rotate any one of the disks 45 in either direction, except through the medium of the lever 18. When the lever 18 is subsequently operated the arm 56 engages the rearwardly extending portion of the dog 70 raising its nose out of the notch 71 so that the disk 45 can be rotated in a clockwise direction as viewed in Fig. 6. Each time the nose of the dog 70 engages the notch 71 the arm 56 raises it when the lever 18 is actuated.

Means are provided to lock the register against actuation when the resetting mechanism has been partially operated. This means consists of a disk 75 secured to the shaft 10 and provided with a notch 76 which notch receives a lug 77 carried on a lever 78, which lug is normally urged away from the notch 76 by means of a spring 79 secured to the other end of the lever and to a pin 80 in the sidewall 4. The lever 78 is moved against the tension of the spring 79 so that the lug 77 enters the notch 76 each time the lever 18 is operated, this movement of the lever 78 being effected by means of the pin 26 engaging a cam portion 81 of the lever 78. As the shaft 10 is rotated to reset the counters the notch 76 is carried beyond the lug 77 so that the pin 26 engages the now immovable lever 78 and locks the operating lever 18 against actuation. It will, therefore, be noted that it is impossible to actuate the lever 18 to register a number when the resetting mechanism has been partially operated and it is likewise impossible to operate the resetting mechanism when the lever 18 has been partially operated. A complete interlocking result is therefore obtained.

When used on street cars the detail counters or disks 45 should be reset when each town is passed, or when reaching the end of the run or at other predetermined intervals. When used in milling establishments, slaughter houses and the like, it is desirable that the detail counters should be reset at the end of each hour or at the end of a given shift of employees. Means are provided to indicate whether this resetting has been performed and this means consists of the indicator 82 having the words "In" or "Out", "A. M." or "P. M.", or other suitable indicia thereon. The shaft 10 is provided with a pinion 83 which meshes with a gear 84 on a stud shaft 85 in the sidewall 3, which gear 84 meshes with a gear 86 on a stud shaft 87 likewise mounted in the sidewall 3. The gear 86 is provided with a pin 88 which projects through a slot 89 in an arm 90 secured to a stud 91 in the sidewall 3. The gearing is of such a ratio that for each complete rotation of the shaft 10 the pin 88 makes one-half a revolution so as to move the arm 90 up or down so that the indicia "In" or "Out", "A. M." or "P. M.", or other suitable indicia will appear in the sight opening 92.

The full stroke mechanism consists of teeth 94 on the arm 21 which, as before mentioned is rocked by the operating lever 18, which teeth 94 engage a two-way dog 95 normally held in the position shown in Fig. 7 by means of a lever 96 pressed against the dog 95 by means of a spring 97. This full stroke mechanism is of a well-known type and requires no further description.

Means are provided to audibly indicate that a number has been registered. This means is indicated by way of illustration by a bell 98 mounted on the back of the casing by means of a stud 99. The arm 22 actuated by the operating lever 18 carries a pivoted lever 100 normally held in the position shown in Fig. 7 by means of a spring 101. The movement of the lever 100 in an anti-clockwise direction as viewed in Fig. 7 is stopped by means of a pin 102 carried by the arm 22, to which pin 102 the spring 101 is attached. As the arm 22 moves upwardly as viewed in Fig. 7 upon the actuation of the operating lever 18, the knob 103 of the lever 100 engages one end of a lever 104 fulcrumed on a pin 105 raising the lever 104 against the tension of the spring 106. As the nose 103 moves above the lever 104, the spring 106 retracts the lever 104 until it strikes a pin 107, but the clapper 108 continues its movement through inertia, striking the bell 98 and being retracted into the position shown in Fig. 13 by gravity and by the action of a spring 109 secured to a pin 110 on the pivoted arm 111 which carries the clapper 108, and to a pin 112 on the lever 104.

This invention is capable of being modified almost indefinitely and the preferred embodiment thereof has been shown and described by way of illustration only. I, therefore, desire to claim my invention broadly so as to cover every embodiment thereof which may fairly fall within the scope of the appended claims.

Having described my invention, I claim:

1. In a register, the combination of a zero setting shaft, a disk provided with a notch secured to said shaft, a register drum, actuating means therefor, said actuating means including a pin, and a lever having a projection on one side and a cam surface on the other side thereof, said pin engaging said cam surface when the actuating means is operated to force said projection into said notch and thereby lock said shaft against rotation.

2. In a register, the combination of a zero setting shaft, a disk provided with a notch secured to said shaft, a register drum, actuating means therefor including a pin, a lever having a projection on one side and a cam surface on the other side, and spring means to normally hold said projection in retracted relation with regard to said notch, said pin engaging said cam surface and forcing said projection into said notch against the tension of said spring when said actuating means is being operated.

3. In a machine of the type described, an operating lever, a second lever connected thereto, a pivoted lever mounted on said second lever, a signal, a full stroke mechanism, a link connecting said operating lever and said second lever, and means whereby said signal is controlled by said pivoted lever and said full stroke mechanism and link are operated by said second lever.

4. In a machine of the type described, a three-armed lever, a register mechanism operatively connected with one of said arms, a full stroke mechanism operatively connected with another of said arms, a pivoted lever mounted on the third of said arms, a signal, and means operatively connected with said pivoted lever and said signal.

5. In a register, the combination of a zero setting shaft, a disk provided with a notch secured to said shaft, a register drum, actuating means therefor, said actuating means including a lever pivoted on said zero setting shaft, a pin mounted on said lever and a second lever having a projection on one side and a cam surface on the other side thereof, said pin engaging said cam surface when the actuating means is operated to force said projection into said notch and thereby lock said shaft against rotation.

6. In a register, the combination of a zero setting shaft, a disk provided with a notch secured to said shaft, a register drum, actuating means therefor, said actuating means including a lever pivoted on said zero setting shaft, a pin mounted on said lever, a second lever having a projection on one side and a cam surface on the other side thereof, and spring means to normally hold said projection in retracted relation with regard to said notch.

In testimony whereof I affix my signature.

BRUCE H. TINGLEY.